United States Patent [19]

Fan

[11] Patent Number: 5,467,201
[45] Date of Patent: Nov. 14, 1995

[54] ITERATIVE ERROR DIFFUSION SYSTEM

[75] Inventor: Zhigang Fan, Webster, N.Y.

[73] Assignee: Xerox Corporation, Stamford, Conn.

[21] Appl. No.: 251,450

[22] Filed: May 31, 1994

[51] Int. Cl.$^6$ .................................................. H04N 1/40
[52] U.S. Cl. ........................ 358/447; 358/448; 358/456; 358/457; 382/252
[58] Field of Search ................................. 358/445, 447, 358/448, 455, 456, 457, 458, 463; 382/237, 251, 252

[56] References Cited

U.S. PATENT DOCUMENTS

| | | | |
|---|---|---|---|
| 4,339,774 | 7/1982 | Temple | 358/283 |
| 4,733,230 | 3/1988 | Kurihara et al. | 340/728 |
| 4,876,610 | 10/1989 | Ohsawa et al. | 358/443 |
| 4,924,322 | 5/1990 | Kurosawa et al. | 358/448 |
| 4,955,065 | 9/1990 | Ulichney | 382/50 |
| 4,969,052 | 11/1990 | Ishida et al. | 358/457 |
| 5,014,333 | 5/1991 | Miller et al. | 382/54 |
| 5,045,952 | 9/1991 | Eschbach | 358/447 |
| 5,077,615 | 12/1991 | Tsuji | 358/298 |
| 5,077,812 | 12/1991 | Kanno et al. | 382/50 |
| 5,109,282 | 4/1992 | Peli | 358/298 |
| 5,130,823 | 7/1992 | Bowers | 358/465 |
| 5,172,247 | 12/1992 | Ghaderi | 358/456 |
| 5,208,871 | 5/1993 | Eschbach | 382/41 |
| 5,321,525 | 6/1994 | Hains | 358/457 |

OTHER PUBLICATIONS

Floyd and Steinberg "An Adaptive Algorithm For Spatial Greyscale", Proceedings of the SID 17/2, 75–77 (1976).
Jarvis, et al. "A Survey of Techniques for the Display of Continuous Tone Pictures on Bilevel Displays", Computer Graphics and Image Processing, vol. 5, pp. 13–40 (1976).
Stucki "MECCA–A Multiple–Error Correction Computation Algorithm For Bilevlse Image Hardcopy Reproduction", IBM Res. Rep. RZ1060 (1981).
"Images from Computers" by M. R. Schroder in IEEE Spectrum, pp. 66–78 (1969).
"Design of Optimal Filters for Error Feedback Quantization of Monochrome Pictures" by Jung Guk Kim & Gil Kim, Information Sciences 39, pp. 285–298 (1986).
R. Ulichney "Digital Halftoning", The MIT Press, Cambridge, Mass. (1987).
"Error Diffusion with More Symmetric Error Distribution" in Human Vision, Visual Processing, and Digital Display V, Bernice E. Rogowitz, Jan P. Allebach, Editors, Proc. SPIE 2179, pp. 150–158 on Feb. 8–10, 1994.

Primary Examiner—Edward L. Coles, Sr.
Assistant Examiner—Thomas D. Lee
Attorney, Agent, or Firm—Thomas B. Zell

[57] ABSTRACT

An image processing system with iterative error diffusion for halftoning a gray image made up of gray image signals to a binary image made up of binary image signals. The system uses two operational modes A and B to perform the error diffusion. During operational mode A, gray image signals stored in a scanline buffer are quantized to form binary image signals. Quantization errors resulting during operational mode A are distributed symmetrically to a selected set of error signals that have corresponding gray image signals in the scanline buffer and outside the scanline buffer. During a first iterative operation in mode B, error signals having corresponding gray image signals in the scanline buffer are dispersed symmetrically to the selected set of error signals. However, during a second iterative operation in mode B, the error signals having corresponding gray image signals in the scanline buffer are dispersed symmetrically to those error signals in the selected set of error signals having corresponding gray image signals outside the scanline buffer.

25 Claims, 4 Drawing Sheets

ITERATIVE ERROR DIFFUSION SYSTEM

The present invention relates to a digital halftoning system, and more particularly, a digital halftoning system that iteratively diffuses error to reduce the formation of visible correlated patterns or artifacts.

BACKGROUND OF THE INVENTION

Digital halftoning converts image information comprising a large number of gray scaled pixel values to a reduced number of gray scaled pixel values in order that image information be rendered for display or hardcopy (printed) output. Image information, be it color or black and white, is commonly derived by scanning, initially at least, in a gray level format containing a large number of gray density levels, e.g.: 256 levels for black and white and more than 16 million ($256^3$) levels for color, which is usually not reproducible on standard printing and display systems. The term "gray level" is used herein to described data for both black and white and color applications. For example, standard printing systems print in a limited number of levels, either a spot or a no spot in the binary case, or a limited number of levels associated with the spot, such as four in the quaternary case. Thus, image information encoded by a large number of gray level values must be converted to a fewer number of gray level values in order that the image information be rendered on typical display and printing systems.

One method of converting gray level pixel image data to binary level pixel image data is through the use of dithering or screening processes. In such arrangements, over a given area, each gray level pixel within the area is compared to one of a set of preselected thresholds, comprising a matrix of threshold values or a halftone cell. The effect of such an arrangement is that, for an area where the image is gray, some of the thresholds within the matrix will be exceeded, while others are not. In the binary case, the portions of the matrix, or cell elements, in which the thresholds are exceeded are printed as black, while the remaining elements are allowed to remain white. The effect of the distribution of black and white over the cell is integrated by the human eye as gray.

Dithering presents problems, however, in that the amount of gray within an original image is not maintained exactly over an area, because the finite number of elements inside each halftone cell only allows the reproduction of a finite number of gray levels. The error arising from the difference between the threshold value and the actual gray level value at any particular cell is simply thrown away. This results in loss of image information. Dithering creates significant image artifacts because it ignores this error completely, for example, bands or false contour artifacts, can be seen in smooth image areas. In this example, the image input gray level varies smoothly over an area while the halftoned image has to make a transition from one halftone dot (gray level) to another. This transition can clearly be seen as a band or pattern running through smooth image parts.

Other techniques exist that convert gray images to binary or a lesser level of gray while attempting to preserve gray density of the images. Error diffusion, for example, attempts to maintain gray density by making the conversion from gray pixels to binary or other level pixels on a pixel-by-pixel basis. The procedure examines each pixel value with respect to a threshold, and the difference between the gray level pixel value and the threshold is then forwarded to a selected group of neighboring pixels, in accordance with a weighting scheme. The corrected image pixels are then considered input to the processing. In this way, the error calculated includes all errors previously made.

Basic error diffusion is proposed by Floyd and Steinberg, in "An Adaptive Algorithm for Spatial Greyscale", Proceedings of the SID 17/2, 75–77 (1976) (hereinafter, "Floyd and Steinberg"). Modifications to the error diffusion algorithm taught by Floyd and Steinberg have been proposed, e.g.: a different weighting matrix, as taught, for example, in "A Survey of Techniques for the Display of Continuous Tone Pictures on Bi-level Displays" by Jarvis et al., Computer Graphics and Image Processing, Vol. 5., pp. 13–40 (1976), and in "MECCA—A Multiple-Error Correction Computation Algorithm for Bi-Level Image Hardcopy Reproduction" by Stucki, IBM Res. Rep. RZ1060 (1981). Other, examples of Floyed and Steinberg error diffusion technique having enhanced error calculation and weight allocation schemes include U.S. Pat. Nos. 5,208,871; 4,924,322; 4,339,774; 4,955,065; 5,045,952; 5,130,823; 5,014,333; 5,077,615; 4,969,052; 5,077,812; 4,876,610; and 4,733,230. Also of interest is U.S. patent application Ser. 07/755,380, entitled "Method For Quantization Gray Level Pixel Data With Application Of Under Compensated Error Diffusion" by R. Eschbach, which teaches a method for the application of under compensated error diffusion to a pixel quantizing method in the conversion of image data from a number of input levels that is relatively large with respect to a number of desired output levels.

An alternative error diffusion procedure is taught in "Images from computers" by M. R. Schröder (sometimes spelled Schroeder) in IEEE Spectrum, pp 66–78 (1969) (hereinafter Schröder). In this method the error is only calculated between the original input pixel and the output, neglecting all previously made errors. This method leads to a poorer gray level representation than Floyd and Steinberg but to higher image contrast. Modifications to the algorithm by Schröder are taught, for example, in "Design of Optimal Filters for Error-Feedback Quantization of Monochrome Pictures" by Jung Guk Kim and Gil Kim, Information Sciences 39, pp 285–298 (1986).

Since the Floyd and Steinberg error diffusion technique is not periodic in nature, it does not produce output images with repeating patterns in uniform image areas as does the dither or screening technique. Error diffusion, however, does introduce correlated patterns, sometimes called "worms", in uniform image areas particularly in shadow and highlight areas. Some schemes developed that try to minimize the worm effect are described by R. Ulichney in "Digital Halftoning", The MIT Press, Cambridge, Mass (1987), which include: using random weights or thresholds (e.g. U.S. Pat. No. 5,130,823); increasing the size of the selected group of neighboring pixels (or window size); and applying a "serpent scanning" technique to the input image so that adjacent lines of the input image are processed in opposite directions (e.g. U.S. Pat. No. 4,955,065). Since these improvements are coupled with new artifacts or with a rise in noise level, they only tend to alleviate the worm problem and not eliminate it. Disclosed in U.S. patent application Ser. No. 08/102,330 to Fan, entitled "Balanced Error Diffusion System", (also published as "Error Diffusion With A More Symmetric Error Distribution" in Human Vision, Visual Processing, and Digital Display V, Bernice E. Rogowitz, Jan P. Allebach, Editors, Proc. SPIE 2179, pp. 150–158 on Feb. 8–10, 1994) is a digital halftoning system that disperses quantization errors resulting from error diffusion to surrounding pixels using a forward pass and a backward pass.

SUMMARY OF THE INVENTION

In accordance with one aspect of the invention there is provided an apparatus for converting a gray image composed of gray image signals to a binary image composed of binary image signals, with each gray image signal of the gray image having a corresponding error signal. The apparatus includes means for segmenting the gray image into a plurality of image portions, the segmenting means forming a first image portion and a second image portion. Means modify each of the gray image signals in the first image portion with a corresponding error signal to form modified gray image signals. Means quantize each of the modified gray image signal in the first image portion with a threshold value, the quantizing means forming a binary image signal for each of the gray image signals in the first image portion. Means determine a quantization error for each of the modified gray image signals in the first image portion. Means distribute the quantization error for each of the modified gray image signals to a set of error signals, wherein a first subset of the set of error signals has corresponding gray image signals in the first image portion and a second subset of the set of error signals has corresponding gray image signals in the second image portion. Means for processing each error signal in the first subset of error signals with a first iterative pass and a second iterative pass, the first iterative pass dispersing the first subset of error signals to error signals in the set of error signals, and the second iterative dispersing the first subset of error signals to error signals in the second subset of error signals.

In accordance with another aspect of the invention there is provided a method for converting a gray image composed of gray image signals to a binary image composed of binary image signals, with each gray image signal of the gray image having a corresponding error signal. The method includes the steps of segmenting the gray image into a plurality of image portions, said segmenting step forming a first image portion and a second image portion; modifying each of the gray image signals in the first image portion with a corresponding error signal; quantizing each of the modified gray image signals in the first image portion with a threshold value, said quantizing step forming a binary image signal for each of the gray image signals in the first image portion; determining, in response to said quantizing step, a quantization error for each of the modified gray image signals in the first image portion; distributing the quantization error for each modified gray image signal to a set of error signals, wherein a first subset of the set of error signals has corresponding gray image signals in the first image portion and a second subset of the set of error signals has corresponding gray image signals in the second image portion; and iteratively processing each error signal in the first subset of error signals with a first iterative pass and a second iterative pass, the first iterative pass dispersing the first subset of error signals to error signal in the set of error signals, and the second iterative pass dispersing the first subset of error signals to error signals in the second subset of error signals.

BRIEF DESCRIPTION OF THE DRAWINGS

These and other aspects of the invention will become apparent from the following descriptions that illustrate a preferred embodiment of the invention read in conjunction with the accompanying drawings in which.

DETAILED DESCRIPTION

Figure 1:
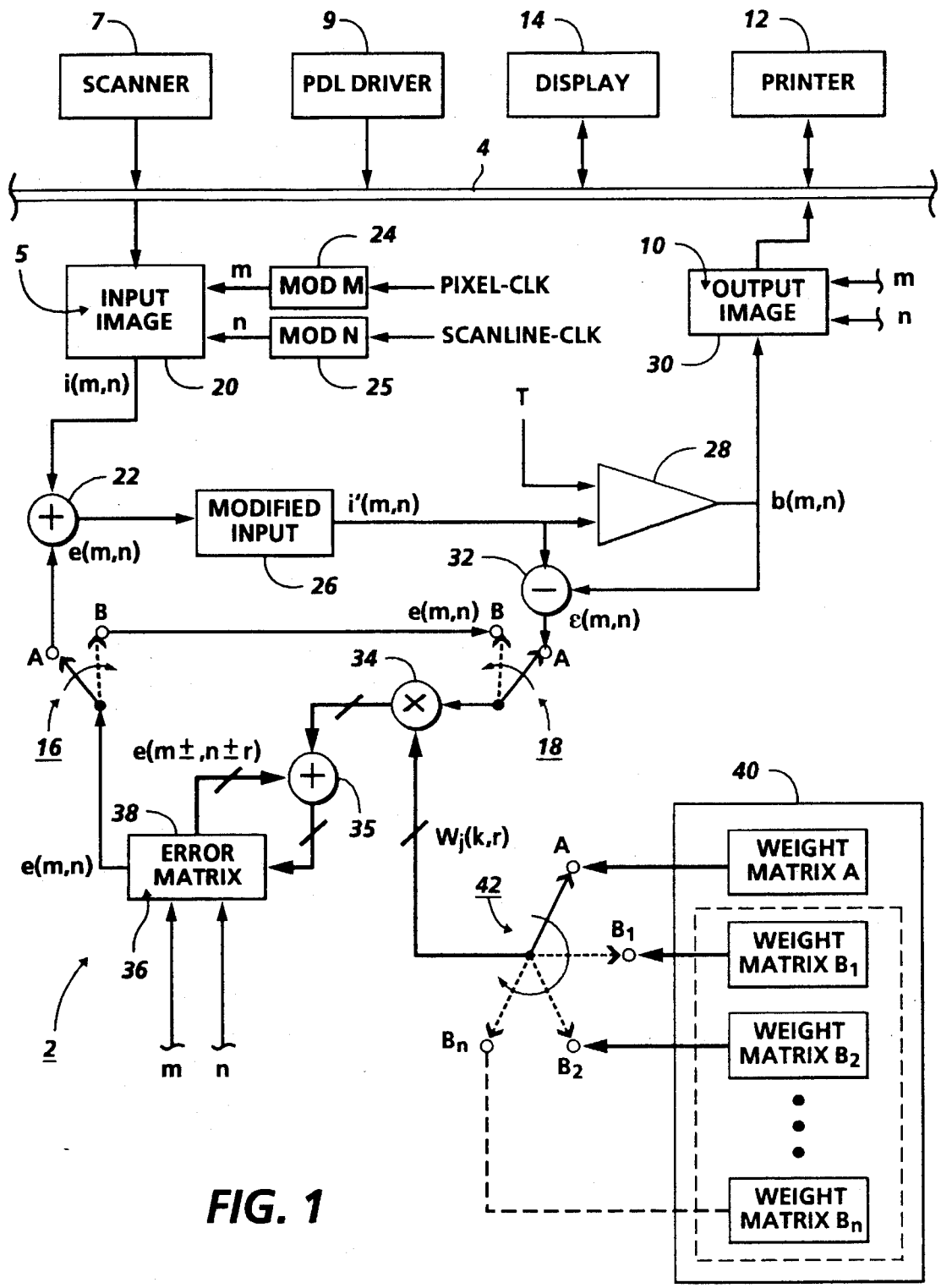
FIG. 1 is a block diagram of a basic system for carrying out the present invention.

Referring now to the drawings where the showings are for the purpose of describing the preferred embodiment of the invention and not for limiting same, a general block diagram of image processing system 2 is shown in FIG. 1. Input for image processing system 2 is in the form of electrical signals; the input to the system is coordinated using device interface or network 4 which is adapted to receive signals representing input image 5 from image input terminals such as scanner 7 or page description language driver (PDL) 9. The input image 5 is segmented into a plurality of scanlines (or image portions) one through N where each scanline (or portion) is composed of one through M picture elements (pixels). Input image 5 can be described using an M×N matrix of individual electrical signals or pixels i(m,n), where each pixel has a pixel density of gray K levels (e.g. 256 levels). Image processing system 2 converts gray input image 5 having pixels with K density levels to output image 10 having pixels of L pixel density levels, where L is less than K and typically binary. The iterative error diffusion technique of the present invention maintains average gray density of input image signal in resulting output image signals by diffusing quantization error of each output pixel b(m,n) to surrounding input pixels. Quantization error for each pixel is iteratively diffused to minimize the introduction of correlated patterns such as worms that can form in output image 10 during the error diffusion process. Upon completing the conversion of gray image 5 to binary image 10, binary image 10 is transmitted through output device interface or network 4 to an image output terminal such as printer 12 or terminal display 14.

Image processing system 2 transforms gray pixels or image signals i(m,n) to binary pixels or image signals b(m,n), scanline by scanline, from top to bottom, using two operational modes. During operational mode A, binary pixel quantization error of quantized gray pixels is calculated and diffused symmetrically about input image 5. A fraction of quantization error e(m,n) for each binary pixel b(m,n) is diffused backwards from the process direction. However, because the quantization error is diffused symmetrically about each corresponding input pixel i(m,n), a residual error is determined for each binary output pixel b(m,n) determined during operational mode A. Consequently, during operational mode B the residual quantization error remaining after determining binary output values b(1 ... m ... M,n) for scanline n is diffused symmetrically about other unquantized input pixels on unprocessed scanlines (e.g., n+1). Quantization error diffused symmetrically during operational mode B is performed using several iterative steps until the residual quantization error e(m,n) becomes zero or insignificantly small for the current scanline n. Since residual error is processed on a scanline basis, operational mode switches occur at the scanline boundaries (n) of input image 5.

Initially, image processing system 2 sets mode switches 16 and 18 to operational mode or position A. Once image pixels forming scanline n of input image 5 are received from scanner 7 and stored in image memory section 20, input pixels i(1 ... m ... M,n) for each pixel in scanline n are individually and sequentially addressed using modulus-M counter 24 and modulus-N counter 25 and transmitted to signal adder 22. Counters 24 and 25 are initialized to a zero value corresponding to input pixel location i(0,0) in input image 5. Each subsequent pixel in the scanline n is addressed in memory 10 by incrementing modulus-M counter 24 using pixel clock 24. At signal adder 22, input pixel i(m,n) is added to quantization error value $\epsilon(m,n)$ which is initially zero and described in detail later. The output of adder 22, modified input pixel i'(m,n), is stored in data latch 26. Subsequently, modified input pixel i'(m,n) is transmitted from data latch 26 to thresholding element (or comparator) 28. Thresholding element 28 compares modified input pixel i'(m,n) to threshold value T (which may vary as taught for example in U.S. Pat. No. 5,045,952), to determine corresponding binary output pixel $b(\bar{m},n)$. The resulting output pixel b(m,n) forms part of output image 10 and is stored in memory section 30.

Binary output pixel b(m,n) output from comparator 28 includes quantization error $\epsilon(m,n)$ which corresponds to the difference between the pixel density of the modified input pixel i'(m,n) and the binary output pixel b(m,n). Subsequent to thresholding input pixel i'(m,n), the quantization error $\epsilon(m,n)$ for output pixel b(m,n) is determined at signal subtracter 32 where the output of comparator 28, output pixel b(m,n), is subtracted from the modified input pixel i'(m,n). The quantization error signal $\epsilon(m,n)$ output from signal subtracter 32 (e.g. i'(m,n)–b(m,n)) is transmitted through mode switch 18, set to position A, to multiplier 34. At multiplier 34 quantization error $\epsilon(m,n)$ is diffused to the surrounding error signals e(m+k,n+r), where k and r are the dimensions of weight matrix A stored in memory section 40. Quantization error e(m,n), output from signal subtracter 32 is multiplied with each element in weight matrix A (e.g. $W_0(k,r)$) at multiplier 34. Each product output by multiplier 34 is added at signal adder 35 to the current value of each error signal e(m±k,n±r) in error matrix 36 stored in memory section 38. The resulting error signals output from adder 35 are stored in memory section 38, replacing any previously stored error signal. In general, error matrix 36, which is initialized to zero, has a length of a scanline and a depth of k pixels as defined by the surrounding set of input pixels (m±k,n±r). Input pixels with processed output pixels are not adjusted for error diffused along the currently processed scanline in a backwards direction (e.g. m, m–1, m–2, etc.). In accordance with one aspect of the invention, to maintain average gray density of input image 5 in output image 10, error diffused backwards to pixels with corresponding binary output values b(m,n) already determined is iteratively propagated or diffused to input pixel in subsequent scanlines i(1 ... m ... M,n+1 ... N).

Quantization error $\epsilon(m,n)$ for each modified input pixel i'(m,n) determined at signal subtracter 32 is diffused in accordance with weight matrix A stored in memory section 40. During operational mode A, matrix selector switch 42 is set to position A, which selects weight matrix A for defining how quantization error $\epsilon(m,n)$ is diffused to error signals in error matrix 36. Matrix selector switch 42, however, can be set to a plurality of setting that select from weight matrices $B_1$ through $B_n$ during operational mode B which is discussed in detail later. With reference again to operational mode A, weight matrix A (e.g. $W_0(k,r)$) which is shown in detail in FIG. 2 defines what fraction of the quantization error $\epsilon(m,n)$ is disperses or diffused to each error signal in a set of the surrounding error signals.

Figures 2, 3:
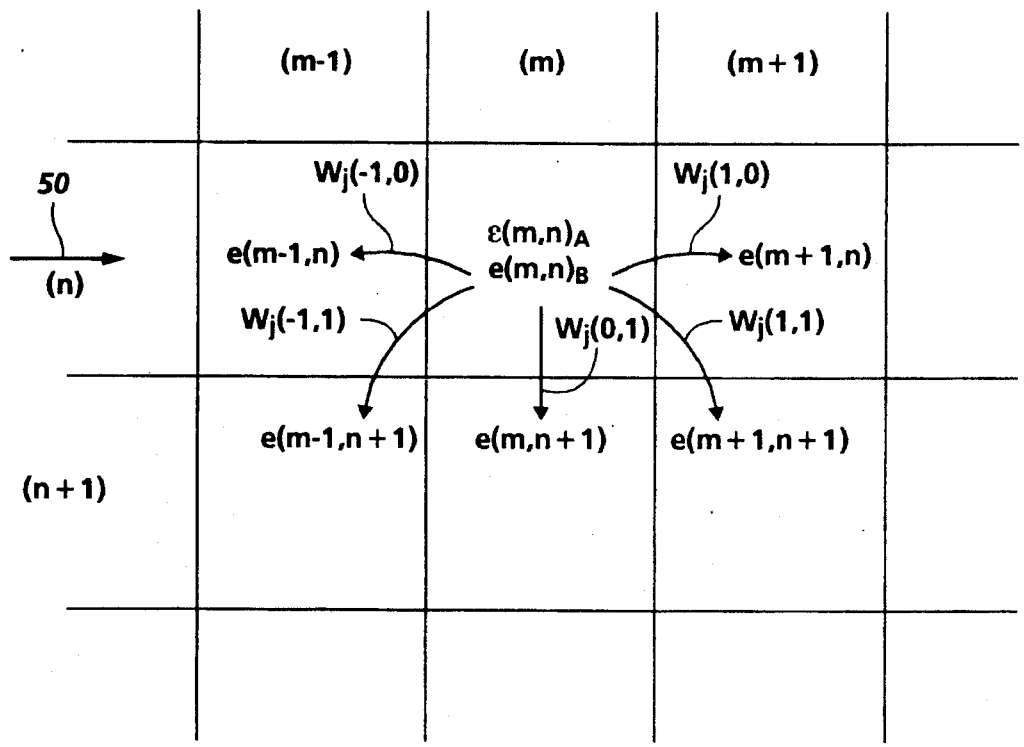
FIG. 2 shows weight matrix A used for operational mode A and two iterations of weight matrix B used for operational mode B.
FIG. 3 is a schematic view of pixel positions of an image to illustrate the iterative error diffusion technique of the present invention.

In general, quantization error $\epsilon(m,n)$ can be diffused to any number of pixels surrounding input pixel i(m,n), except for those input pixels in previously processed scanlines (e.g., n–1). FIG. 3 shows a section of input image 5 being operated on in the process direction depicted by arrow 50 as defined above. In the preferred embodiment of the present invention, each weight matrix $W_j(k,r)$ stored in memory section 40 holds five weights, $W_j(-1,0)$, $W_j(-1,1)$, $W_j(0,1)$, $W_j(1,0)$ and $W_j(1,1)$, each of which defines what fraction of quantization error $\epsilon(m,n)$ is to be diffused to surrounding quantization error values e(m–1, n), e(m–1, n+1), e(m,n+1), e(m+1, n) and e(m+1, n+1), respectively. The error diffused to the surrounding error values is stored in error matrix 36, since the diffused error can not always be passed or will not be immediately passed onto the subsequently processed input pixel at signal adder 22. For example during operational mode A, quantization error $\epsilon(m,n)$ for corresponding input pixel i(m,n) is diffused as shown in FIG. 3 using the five weights $W_0(-1,0)=½$, $W_0(-1,1)=-1/32$, $W_0(0,1)=1/16$, $W_0(1,0)=½$ and $W_0(1,1)=-1/32$ as defined by weight matrix A shown in FIG. 2 to surrounding error values e(m–1, n), e(m–1, n+1), e(m,n+1), e(m+1, n) and e(m+1, n+1) stored in error matrix 36.

After diffusing quantization error $\epsilon(m,n)$ of input pixel i(m,n) to the set of surrounding error values stored in error matrix 36 evaluated at signal adder 22, pixel counter 24 is incremented using the pixel-CLK in order to reference the next input pixel i(m,n) in the scanline n stored in memory section 20. The currently referenced input pixel i(m,n) is transmitted to signal adder 22 and added to the error value e(m,n) (previously e(m+1, n) before counter 24 was incremented). Error value e(m,n) is transmitted to signal adder 22 from error matrix 36 stored in memory section 38 through mode switch 16 set to position A during operational mode A. Once transmitted the value of error value e(m,n) stored in memory section 38 is reset to zero, indicating the error e(m,n) has been diffused to other image signals in input image 5. The sum of modified input pixel i'(m,n) output by signal adder 22 is subsequently transmitted to data latch 26 as described for the previous input pixel above. Each input pixel i(1 ... m ... M,n) in scanline n is evaluated by image processing system 2 in operational mode A by successively incrementing pixel counter 24. After the last pixel in pixel counter 24 is evaluated in operational mode A, pixel counter 24 is incremented to the start of the present scanline n, and mode switches 16 and 18 are switched to position or operational mode B. Thus, before switching to operational mode B quantization error e(m,n) for each pixel in scanline n is calculated in the first iteration (J=1) of scanline n.

Subsequent iterations of scanline n are performed in operational mode B, where mode switches 16 and 18 are set to position B. In operational mode B remaining quantization error values e(m,n) stored in error matrix 36 for each corresponding input pixel i(m,n) are diffused symmetrically throughout the input image 5. Quantization error values remaining in error matrix 36 correspond to error spread backwards during the first iterative symmetric error spreading performed in operational mode A. The backwards spread error values resulting from operational mode A are stored in error matrix 36 and further dispersed, again symmetrically, in subsequent iterations performed in operational mode B. In operational mode B, quantization error stored in error matrix 36 is dispersed using several iterations until the quantization error for a scanline becomes zero or insignificantly small.

Since the maximum value of the quantization error for each iteration in both operational mode A and operational mode B can be predicted for a given set of error diffusion weights (a) the number of iterations (J) is selected to be a fixed constant, typically, between two and four. Given i(m,n), i'(m,n) and b(m,n) denote the input, the modified input and the binary output at pixel (m,n) respectively as defined above, where e(m,n) contains the quantization error at location (m,n) with an initial value of 0, and given $W_j(k,r)$ denotes a weight matrix for the error propagation in the (m,n) direction during the j-th iteration, with the constraint that $W_j(k,r)=W_j(-k,r)$, the present invention can be generally illustrated by the following seven steps performed for each scanline of input image 5:

1. For m=1 to M, do steps 2–5 (first iteration-mode A);
2. i'(m,n):=i(m,n)+e(m,n);
3. If i'(m,n)<threshold, then b(m,n):=0, else b(m,n):=1;
4. e(m,n):=i'(m,n)−b(m,n);
5. DiffuseError(m,n,1);
6. For j=to J, do step 7 (remaining iterations-mode B); and
7. For m:=1 to M, DiffuseError(m,n,j).

Where, DiffuseError(m,n,j) spreads error at pixel (m,n) to its neighbors, as shown for example in FIG. 3, using weight set $\{W_j(k,r)\}$. Specifically, DiffuseError(m,n,j) can be illustrated by the following two steps:

1. For each (k,r) such that $W(k,r)\neq 0$, e(m+k,n+r):=e(m+k, n+r)+e(m,n)×$W_j(k,r)$; and
2. e(m,n):=0.

In accordance with the invention, the average gray density of the input image 5 is maintained over the output image 10. Maintaining average gray density, which is usually a desirable property, requires that the sum of the weights for each iteration j is equal to one, and all error in weight matrix 36 accumulated in the current scanline n is propagated to subsequent scanlines (n+1, n+2, ... ) in the last iteration of operational mode B. Specifically the weights for weight matrix $W_j(k,r)$ defined for each iteration must be such that: $\Sigma_{k,r} W_j(k,r)=1$ for all j; and $W_j(k,r)=0$ for j=J and r=0. In the preferred embodiment of the present invention, weights $W_j(k,r)$ for three iterations are shown in FIG. 2. As discussed above, weight matrix A is used to disperse quantization error during a single iteration of operational mode A for scanline n. In subsequent iterations during operational mode B, weight matrices $B_1$ and $B_2$, also shown in FIG. 2 define weights $W_j(k,r)$. The weight matrices A, $B_1$ and $B_2$ define the manner in which quantization error is dispersed as depicted in FIG. 3 during the first, second and third iterations respectively (e.g. $W_0=A$, $W_1=B_1$ and $W_2=B_2$).

With specific reference to operational mode B for the preferred embodiment of the invention, quantization error in matrix 36 stored in memory section 38 is dispersed in two iterations of scanline n. Initially when mode switches 16 and 17 are set to position B after the first iteration of scanline n in operational mode A as described above, weight matrix selector switch 42 is set to position $B_1$. In operational mode B, the output from error matrix 36, error signal e(m,n) which is selected by pixel (m) and scanline (n) counters 24 and 25, forms a feedback loop which is input to signal multiplier 34. Once transmitted to multiplier 34, error signal e(m,n) is reset to zero to indicate the error is diffused to surrounding error signals e(m±k,n±r). The product output from multiplier 34 is subsequently added to error signals e(m±k,n±r) in error matrix 36 at adder 35. Once the resulting error signals output from adder 35 are stored in memory section 40, replacing the previously stored error signal, pixel counter 24 is incremented using pixel clock 24. For each pixel in scanline n, the process repeats for each pixel (1 ... m ... M) in the scanline when pixel counter 24 is reset to zero. The pixel counter 24 is reset to zero upon completion of the second iteration or first iteration in operational mode B.

At the start of the third iteration (or second iteration in operational mode B), the weight matrix selector switch 42 is set to position $B_2$, and the process of diffusing errors continues for each pixel in scanline n as described above for the first iteration in operational mode B. The second iteration in operational mode B is the final iteration of scanline n and diffuses error signals e(m,n) using weight matrix $W_2(k,r)$, shown in FIG. 2. Error matrix $W_2(k,r)$ insures that error signals (or residual error signal) remaining on scanline n are dispersed to subsequent scanlines (n+1, n+2, ... ). Once the final iteration of scanline n is complete in operational mode B, pixel clock 24 and scanline clock 25 are incremented (i.e., pixel clock 24 is reset to zero) and mode switches 16 and 18 are returned to position A.

Figure 4:
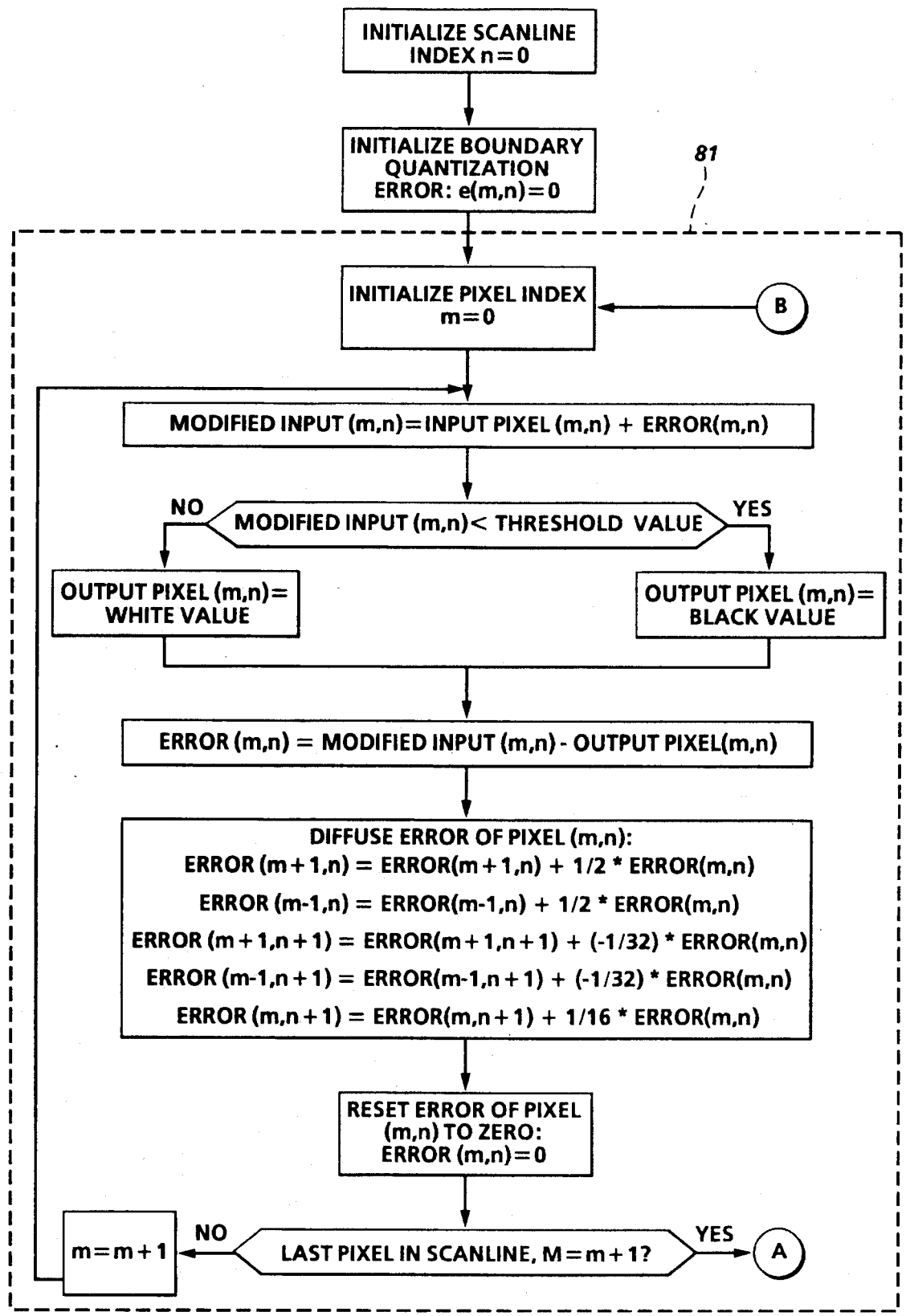
FIGS. 4 and 5 are a flow diagram of the iterative error diffusion technique in accordance with the present invention.
Figure 5:
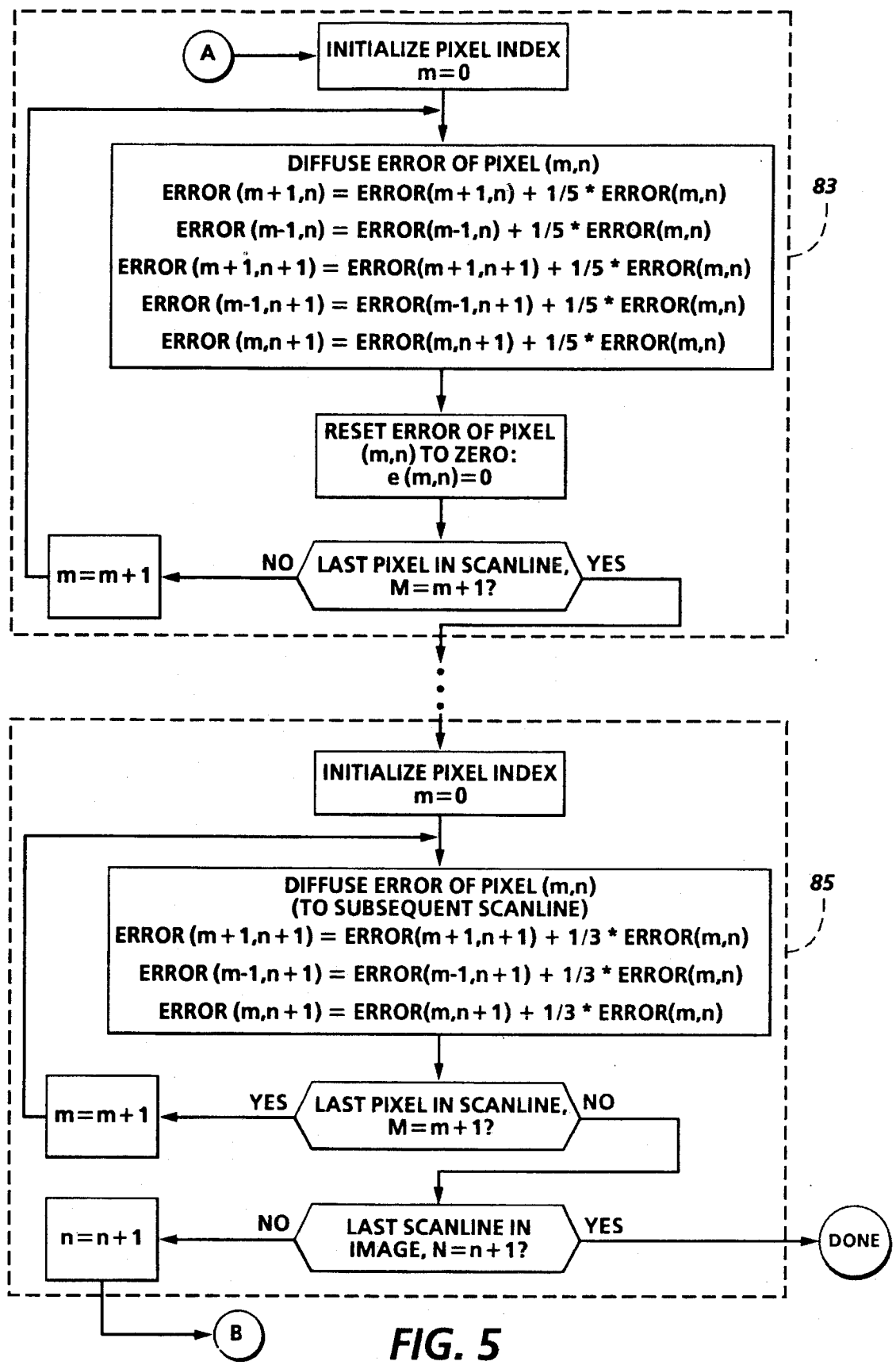

As detailed in the flow diagram shown in FIGS. 4 and 5, image processing system 2 processes the current scanline n and all subsequent scanlines in input image 5 as described above for one iteration in operational mode A (81 in FIG. 4) and two iterations in operational mode B (83 and 85, respectively in FIG. 5). As is shown in FIG. 5, any number of iterations J can be performed in operational mode B by repeating the sequence of steps 83 with a defined weight matrix $W_j(k,r)$. Upon completing the first iteration 81 in operational mode A of the last scanline in input image 5, image processing system 2 transmits the resulting output image 10 stored in memory section 30 for reproduction to printer 12 or display 14 through device interface 4.

From the weight matrices $W_j(k,r)$ shown in FIG. 2, it will no doubt be appreciated that other weight matrices $W_j(k,r)$ and other combinations of J iterative steps could be derived that can be used effectively with the error diffusion processes of the present invention. What is required by this invention is that quantization error be distributed for a current scanline symmetrically in an iterative manner to subsequent scanlines until quantization error for the current scanline becomes insignificantly small. During each iteration j weight matrix $W_j(k,r)$ totals one so that quantization error is distributed evenly throughout the input image to maintain its average gray density in the output image. Although iterative technique of the present invention is computationally demanding, the technique advantageously improves image quality by minimizing the formation of uncorrelated patterns such as worms in the output image.

The disclosed image processing system may be readily implemented in software using object oriented software development environments that provide portable source code that can be compiled for use on a variety of hardware platforms. Alternatively, the disclosed image processing system may be implemented partially or fully in hardware using standard logic circuits or specifically on a single chip using VLSI design. Whether software or hardware is used to implement the system varies depending on the speed and efficiency requirements of the system and also the particular function and the particular software or hardware systems and the particular microprocessor or microcomputer systems being utilized. The image processing system, however, can be readily developed by those skilled in the applicable arts without undue experimentation from the functional description provided herein together with a general knowledge of the computer arts.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

I claim:

1. An image processing apparatus for converting a gray image composed of gray image signals to a binary image composed of binary image signals, with each gray image signal of the gray image having a corresponding error signal, comprising:

means for segmenting the gray image into a plurality of image portions, said segmenting means forming a first image portion and a second image portion;

means for modifying each of the gray image signals in the first image portion with a corresponding error signal to form modified gray image signals;

means for quantizing each of the modified gray image signal in the first image portion with a threshold value, said quantizing means forming a binary image signal for each of the gray image signals in the first image portion;

means for determining a quantization error for each of the modified gray image signals in the first image portion;

means for distributing the quantization error for each of the modified gray image signals to a set of error signals including an error signal corresponding to a previously quantized gray image signal, wherein a first subset of the set of error signals has corresponding gray image signals in the first image portion and a second subset of the set of error signals has corresponding gray image signals in the second image portion; and means for processing each error signal in the first subset of error signals with a first iterative pass in a first mode and a second iterative pass in a second mode, the first iterative pass in the first mode dispersing the first subset of error signals to error signals in the set of error signals, and the second iterative in the second mode dispersing the first subset of error signals to error signals in the second subset of error signals.

2. The apparatus according to claim 1, wherein said processing means processes each error signal in the first subset of error signals with a third iterative pass in the second mode, the third iterative pass dispersing the first subset of error signals to the set of error signals.

3. The apparatus according to claim 1, wherein an image portion is a scanline output from an image scanner.

4. The apparatus according to claim 1, wherein said distributing means distributes the first subset of error signals in accordance with a first weight matrix, $W_0(k,r)$.

5. The apparatus according to claim 4, wherein the first weight matrix $W_0(k,r)$ is defined by $W_0(-1,0)=\frac{1}{2}$, $W_0(1,0)=\frac{1}{2}$, $W_0(-1,1)=-\frac{1}{32}$, $W_0(0,1)=\frac{1}{16}$ and $W_0(1,1)=-\frac{1}{32}$.

6. The apparatus according to claim 4, wherein the second iterative pass in the second mode of said processing means distributes the first subset of error signals in accordance with a second weight matrix, $W_1(k,r)$.

7. The apparatus according to claim 6, wherein the second weight matrix $W_1(k,r)$ is defined by $W_1(-1,0)=\frac{1}{5}$, $W_1(1,0)=\frac{1}{5}$, $W_1(-1,1)=\frac{1}{5}$, $W_1(0,1)=\frac{1}{5}$ and $W_1(1,1)=\frac{1}{5}$.

8. The apparatus according to claim 6, wherein a third iterative pass in the second mode of said processing means distributes the first subset of error signals in accordance with a third weight matrix, $W_2(k,r)$.

9. The apparatus according to claim 8, wherein the third weight matrix $W_2(k,r)$ is defined by $W_2(-1,0)=0$, $W_2(1,0)=0$, $W_2(-1,1)=\frac{1}{3}$, $W_2(0,1)=\frac{1}{3}$ and $W_2(1,1)=\frac{1}{3}$.

10. The apparatus according to claim 1, wherein said quantizing means forms a quaternary image signal for each gray image signal in the first image portion.

11. The apparatus according to claim 1, further comprising an image input terminal for generating the gray image.

12. The apparatus according to claim 11, further comprising an image output terminal for reproducing the binary image.

13. The apparatus according to claim 1, further comprising a memory for storing the plurality of image portions.

14. A method for converting a gray image composed of gray image signals to a binary image composed of binary image signals, with each gray image signal of the gray image having a corresponding error signal, comprising the steps of:

segmenting the gray image into a plurality of image portions, said segmenting step forming a first image portion and a second image portion;

modifying each of the gray image signals in the first image portion with a corresponding error signal;

quantizing each of the modified gray image signals in the first image portion with a threshold value, said quantizing step forming a binary image signal for each of the gray image signals in the first image portion;

determining, in response to said quantizing step, a quantization error for each of the modified gray image signals in the first image portion;

distributing the quantization error for each modified gray image signal to a set of error signals including an error signal corresponding to a previously quantized gray image signal, wherein a first subset of the set of error signals has corresponding gray image signals in the first image portion and a second subset of the set of error signals has corresponding gray image signals in the second image portion; and iteratively processing each error signal in the first subset of error signals with a first iterative pass in a first mode and a second iterative pass in a second mode, the first iterative pass in the first mode dispersing the first subset of error signals to error signal in the set of error signals, and the second iterative pass in the second mode dispersing the first subset of error signals to error signals in the second subset of error signals.

15. The method according to claim 14, wherein said processing step of the first image portion comprises a third iterative pass in the second mode, the third iterative pass dispersing the first subset of error signals after the first iterative pass to error signals in the set of error signals.

16. The method according to claim 14, wherein said segmenting step comprises the of receiving an image portion from a scanline buffer of an image scanner.

17. The method according to claim 14, wherein said distributing step comprises the step of distributing the quantization error in accordance with a first weight matrix $W_0(k,r)$.

18. The method according to claim 17, wherein said distributing step comprises the step of defining the first weight matrix by $W_0(-1,0)=\frac{1}{2}$, $W_0(1,0)=\frac{1}{2}$, $W_0(-1,1)=-\frac{1}{32}$, $W_0(0,1)=\frac{1}{16}$ and $W_0(1,1)=-\frac{1}{32}$.

19. The method according to claim 17, wherein the second iterative pass in the second mode of said processing step comprises the step of dispersing the error signals in accordance with a second weight matrix $W_1(k,r)$.

20. The method according to claim 19, wherein said second dispersing step in the second mode defines the second weight matrix by $W_1(-1,0)=\frac{1}{5}$, $W_1(1,0)=\frac{1}{5}$, $W_1(-$ $1,1)=\frac{1}{5}$, $W_1(0,1)=\frac{1}{5}$ and $W_1(1,1)=\frac{1}{5}$.

21. The method according to claim 19, wherein the third iterative pass in the second mode of said processing step comprises the step of dispersing the error signals in accordance with a third weight matrix $W_2(k,r)$.

22. The method according to claim 21, wherein said third dispersing step in the second mode comprises the step of defining the third weight matrix by $W_2(-1,0)=0$, $W_2(1,0)=0$, $W_2(-1,1)=\frac{1}{3}$, $W_2(0,1)=\frac{1}{3}$ and $W_2(1,1)=\frac{1}{3}$.

23. The method according to claim 14, wherein said quantizing step comprises the step of forming a quaternary image signal for each gray image signal in the first image portion.

24. The method according to claim 14, further comprising the step of receiving the gray image from an image input terminal, said receiving step including the step of storing in a memory the gray image received by said receiving step.

25. The method according to claim 24, further comprising the step of transmitting the binary image signals formed by said quantizing step to an image output terminal.

* * * * *